June 16, 1925.
J. R. BARTHOLOMEW
BRAKE SHOE HEAD
Filed Feb. 3, 1923
1,541,914
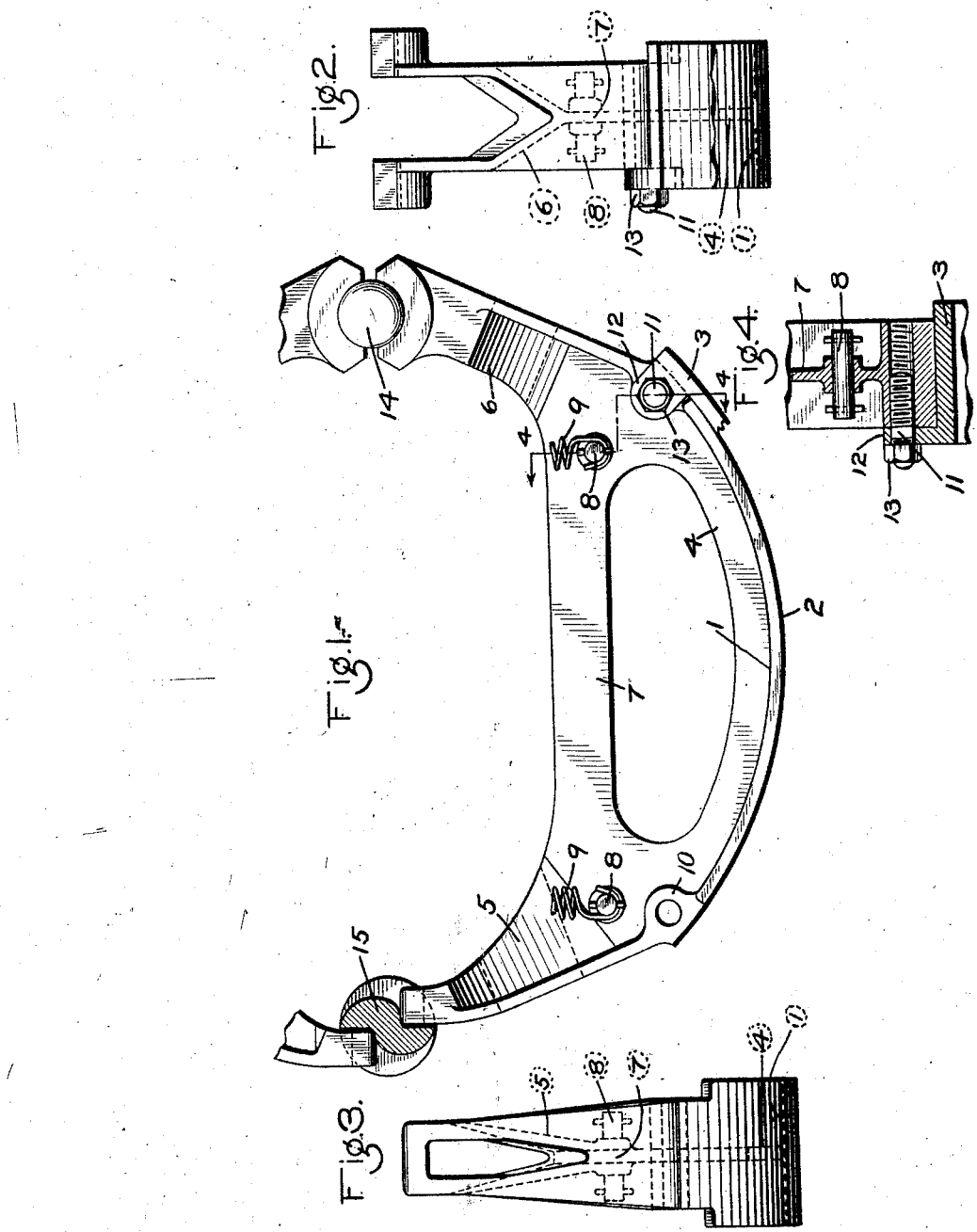
INVENTOR
JOHN R. BARTHOLOMEW
BY
ATTORNEY Patented June 16, 1925.

1,541,914

UNITED STATES PATENT OFFICE.

JOHN R. BARTHOLOMEW, OF BERKELEY, CALIFORNIA, ASSIGNOR TO THE WESTINGHOUSE AIR BRAKE COMPANY, OF WILMERDING, PENNSYLVANIA, A CORPORATION OF PENNSYLVANIA.

BRAKE-SHOE HEAD.

Application filed February 3, 1923. Serial No. 616,848.

*To all whom it may concern:*

Be it known that I, JOHN R. BARTHOLOMEW, a citizen of the United States, residing at Berkeley, in the county of Alameda and State of California, have invented new and useful Improvements in Brake-Shoe Heads, of which the following is a specification.

This invention relates to brake shoe heads, and more particularly to a brake shoe head adapted for the internal expanding type of brake as employed on motor vehicles.

The principal object of my invention is to provide an improved brake shoe head of the above character.

In the accompanying drawing; Fig. 1 is a side elevation of a brake shoe head embodying my invention; Fig. 2 an end view of the pivot end of the head; Fig. 3 an end view of the cam end thereof; and Fig. 4 a section on the line 4—4 of Fig. 1.

The brake shoe head may comprise a face section 1 having an arcuate face 2 to which the brake shoe 3 is adapted to be applied and having a central integral web section 4 with bifurcated ends 5 and 6. The ends of the brake shoe head are tied together by means of an integral strengthening rib 7.

Preferably cast in the web section 4 are pins 8 for receiving the hooked ends of the release springs 9 and adjacent the ends of the arcuate shoe receiving face 2 of the brake head, bosses 10 are provided. Said bosses are tapped to receive studs 11 and the brake shoe 3 is provided with an apertured lug 12 at each end, adapted to be applied to the studs, so that the shoe may be secured to the head by means of nuts 13 applied to the studs. By this construction the brake shoe may be removed without taking the wheel from the vehicle, since it is only necessary to back off the stud nuts and then remove the shoe by a lateral movement in the direction of the axis of the wheel.

The usual pivot pin 14 is mounted in bearings provided in the bifurcated end section 6 and the other end section 5 is provided with a nose portion for engagement with a cam 15.

By means of the above described construction, the metal of the head is so disposed as to provide strength where most needed and at the same time the weight of the brake shoe has been considerably reduced.

Having now described my invention, what I claim as new and desire to secure by Letters Patent, is:

1. The combination with a brake shoe provided with a depending lug at each end, of a brake head having an arcuate face for receiving said shoe and means for securing said lugs to said head and adapted to permit the removal of the shoe by a lateral movement parallel to said face.

2. The combination with a brake shoe provided with a depending side lug at each end, of a brake head having an arcuate face for receiving said shoe and screw threaded studs carried by said head for securing said lugs to the brake head.

3. A brake shoe head comprising an arcuate section for receiving a brake shoe, a web section integral therewith, a rib section connecting the end portions of said web section, and a bifurcated portion at opposite ends of the head.

In testimony whereof I have hereunto set my hand.

JOHN R. BARTHOLOMEW.